(12) United States Patent
Ahn et al.

(10) Patent No.: US 11,512,772 B1
(45) Date of Patent: Nov. 29, 2022

(54) PLANETARY GEAR SET FOR POWER TRANSMISSION APPARATUS

(71) Applicants: Hyundai Motor Company, Seoul (KR); Kia Corporation, Seoul (KR)

(72) Inventors: Chulmin Ahn, Anyang-si (KR); Baekyu Kim, Hwaseong-si (KR); SungGon Byun, Hwaseong-si (KR); Junyoung Ha, Anyang-si (KR); Donghui Cheon, Hwaseong-si (KR); Jieun Kim, Suwon-si (KR); Yohan Kim, Busan (KR); Sun Sung Kwon, Anyang-si (KR); Suhyeon Maeng, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/748,806

(22) Filed: May 19, 2022

(30) Foreign Application Priority Data

Dec. 8, 2021 (KR) .................. 10-2021-0174821

(51) Int. Cl.
*F16H 57/08* (2006.01)
*F16H 1/28* (2006.01)
*F16H 57/021* (2012.01)

(52) U.S. Cl.
CPC ............. *F16H 57/08* (2013.01); *F16H 1/28* (2013.01); *F16H 57/021* (2013.01); *F16H 2057/085* (2013.01)

(58) Field of Classification Search
CPC .......... F16H 57/08; F16H 1/28; F16H 57/021; F16H 2057/085; F16H 37/082
See application file for complete search history.

(56) References Cited

U.S. PATENT DOCUMENTS 7,326,140 B2 * 2/2008 Kim ..................... F16H 3/727
903/910
8,360,927 B2 * 1/2013 Murata ................ F16H 57/082
475/346

(Continued)

FOREIGN PATENT DOCUMENTS

JP H0921449 A * 1/1997
JP 2005067429 A * 3/2005

*Primary Examiner* — Sherry L Estremsky
(74) *Attorney, Agent, or Firm* — Morgan, Lewis & Bockius LLP (57) ABSTRACT

A planetary gear apparatus for a power transmission apparatus including a transmission housing includes a sun gear provided on a first shaft, first and second planet carriers rotatably supporting pinion gears gear-engaged with the sun gear, and a ring gear gear-engaged with the pinion gears, where an internal circumference of the sun gear is spline-engaged with an external circumference of the first shaft, where first and second support shafts are fixed to first and second side surfaces of the ring gear, respectively, where the first support shaft is rotatably supported by a supporting frame fixed to the transmission housing, interposing a first bearing, where the second support shaft is rotatably supported by the transmission housing, interposing a second bearing, where the first planet carrier is rotatably supported by the first support shaft interposing a third bearing, and where the second planet carrier is fixedly connected to a connection end portion of a second shaft.

10 Claims, 4 Drawing Sheets

(56) References Cited

U.S. PATENT DOCUMENTS

| | | | | |
|---|---|---|---|---|
| 2003/0024753 | A1* | 2/2003 | Maruyama | B60K 17/346 180/248 |
| 2006/0027414 | A1* | 2/2006 | Bordini | B60G 3/145 180/363 |
| 2013/0023372 | A1* | 1/2013 | Sada | F16H 3/727 475/343 |
| 2018/0080542 | A1* | 3/2018 | Sugiyama | B60K 6/405 |

* cited by examiner

PLANETARY GEAR SET FOR POWER TRANSMISSION APPARATUS

CROSS-REFERENCE TO RELATED APPLICATION

The present application claims priority to Korean Patent Application No. 10-2021-0174821 filed on Dec. 8, 2021, the entire contents of which is incorporated herein for all purposes by this reference.

BACKGROUND OF THE PRESENT DISCLOSURE

Field of the Present Disclosure

The present disclosure relates to a planetary gear apparatus for a power transmission apparatus.

Description of Related Art

An environment-friendly technology of a vehicle is a core technology which controls survival of a future vehicle industry, and advanced vehicle makers have focused their energy on the development of an environment-friendly vehicle to achieve environmental and fuel efficiency regulations.

Therefore, vehicle makers have developed an electric vehicle (EV), a hybrid electric vehicle (HEV), a fuel cell electric vehicle (FCEV), and the like, as future vehicle technologies.

Because the future vehicle has various technological restrictions such as a weight and cost, the vehicle makers have paid attention to various types of power transmission apparatuses as an alternative of a realistic problem for meeting exhaust gas regulations and improving fuel efficiency performance and have entered into keen competition for developing a power transmission apparatus applied with an efficient planetary gear set.

Figure 1:
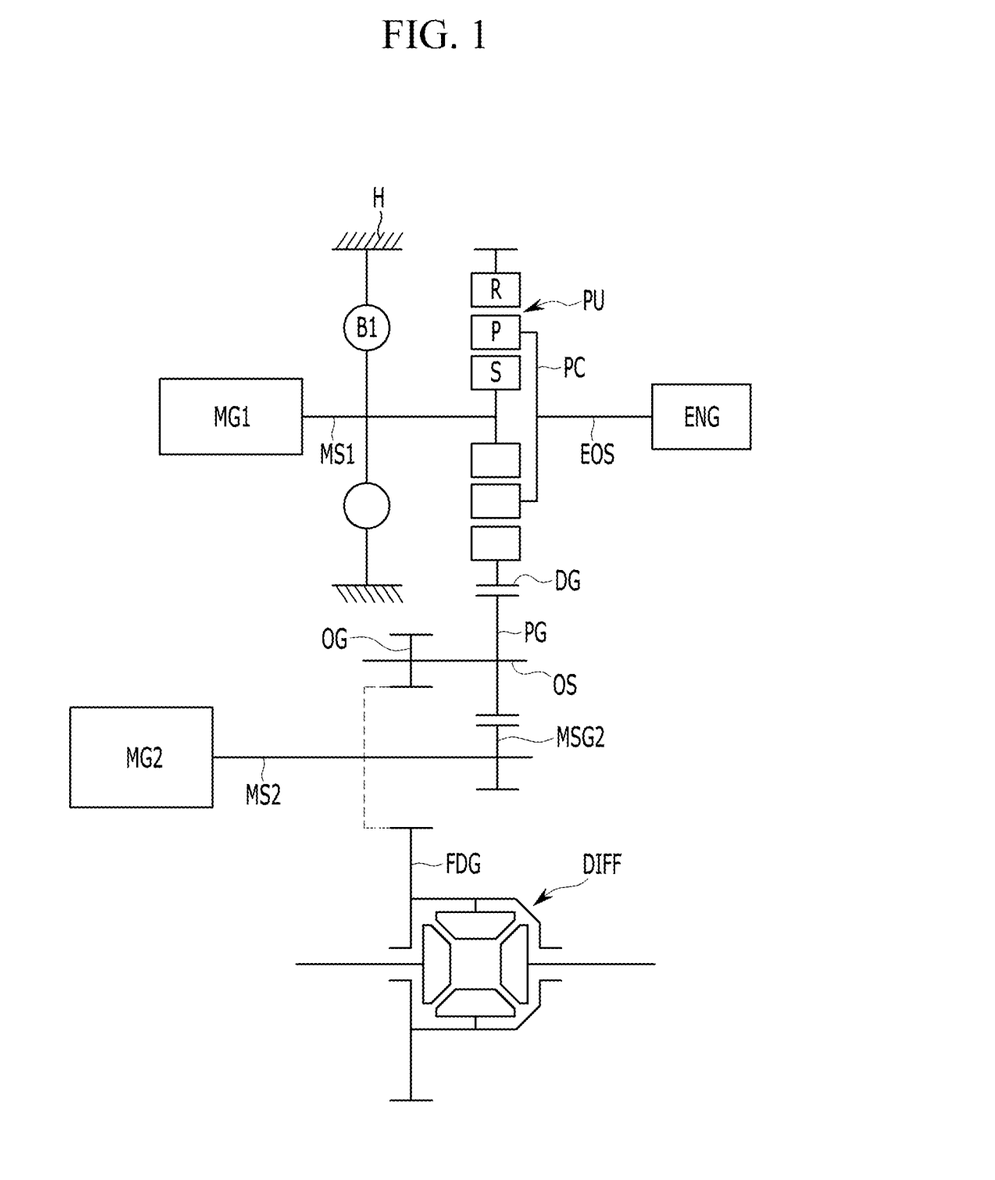
FIG. 1 is a schematic diagram of an exemplary power transmission apparatus.

FIG. 1 is a schematic diagram of an exemplary power transmission apparatus.

Referring to FIG. 1, the exemplary power transmission apparatus is a power transmission apparatus of a hybrid electric vehicle. By the exemplary power transmission apparatus, an EV mode in which the hybrid electric vehicle is driven by only the motor, an HEV mode using both the engine and the motor, and an ENG mode using only the engine may be implemented according to the combination of the engine and the motor.

Such a power transmission apparatus of a hybrid electric vehicle includes an engine ENG and first and second motor-generators MG1 and MG2 as power sources, and includes a planetary gear apparatus PU and an output shaft OS. The planetary gear apparatus PU combines the torque of the engine ENG and the torque of the first motor-generator MG1. The output shaft OS receives torques from the planetary gear apparatus PU and the second motor-generator MG2, and outputs a torque to a differential DIFF.

An engine output shaft EOS receiving the torque of the engine ENG is provided on the same axis of a first motor shaft MS1 of the first motor-generator MG1. A second motor shaft MS2 of the second motor-generator MG2 is provided in parallel with the first motor shaft MS1 of the first motor-generator MG1, and provided with a second motor shaft gear MSG2.

Here, the planetary gear apparatus PU is provided on an axis of the first motor shaft MS1 and the engine output shaft EOS.

That is, a sun gear S of the planetary gear apparatus PU is connected to the first motor shaft MS1, and simultaneously, selectively connectable to a transmission housing H through a first brake B 1, selectively acting as a fixed element.

Furthermore, a planet carrier PC of the planetary gear apparatus PU is connected to the engine output shaft EOS to receive the torque of the engine ENG.

Furthermore, a ring gear R of the planetary gear apparatus PU is integrally formed with a drive gear DG, and externally gear-engaged with a driven gear PG on the output shaft OS.

The planetary gear apparatus PU receives torques through the sun gear S and the planet carrier PC, and is configured to vary the received torque (by increasing and decreasing the speed) and to output the varied torque through the ring gear R. Accordingly, the output shaft OS receives the torque through the driven gear PG, and outputs a torque to the differential DIFF through an output gear OG and differential drive gear FDG.

Figure 2:
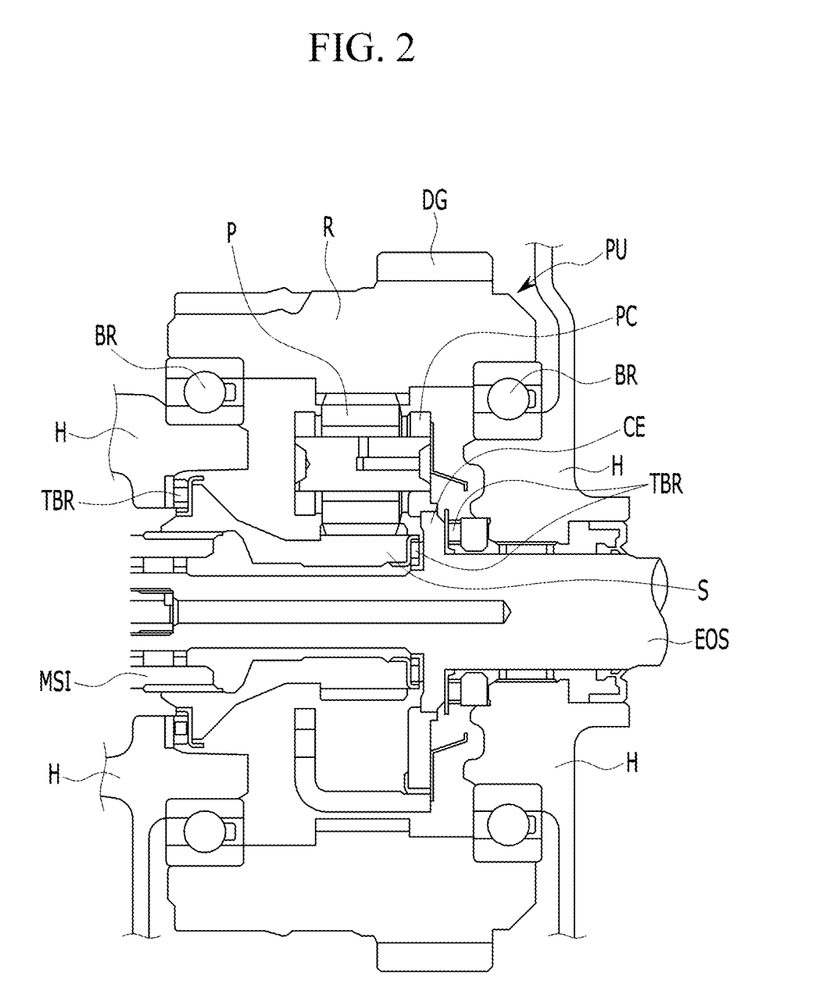
FIG. 2 is a drawing illustrating a conventional supporting structure of a planetary gear set.

FIG. 2 is a cross-sectional view illustrating a conventional supporting structure of a planetary gear set.

Here, referring to FIG. 2, the planetary gear apparatus PU includes the sun gear S, the planet carrier PC rotatably supporting a plurality of pinion gears P externally gear-engaged with the sun gear S, and the ring gear R internally gear-engaged with the plurality of pinion gears P.

The planetary gear apparatus PU is provided on the engine output shaft EOS, and supported by the engine output shaft EOS and the transmission housing H through a plurality of bearings.

The ring gear R is rotatably supported by the transmission housing H by a ball bearing BR provided between an internal circumference of the ring gear R and the transmission housing H.

A first end portion of the sun gear S connected to the first motor shaft MS1 is rotatably supported by the transmission housing H through a thrust bearing TBR.

Furthermore, the planet carrier PC is fixed to a connection end CE formed on the engine output shaft EOS. At the instant time, both end portions of the connection end CE are rotatably supported in the axial direction by thrust bearings TBR provided toward a second end portion of the sun gear S and the transmission housing H. That is, the planet carrier PC is rotatably supported in the axial directions by the connection end CE on the engine output shaft EOS.

In such an exemplary planetary gear set, a radial direction size of the ball bearing BR for supporting the ring gear R to the transmission housing H is large, and an axial direction width of the ring gear R is large to accommodate the ball bearing BR, causing a disadvantage in weight and space efficiency.

Furthermore, supporting structure of the planetary gear apparatus is complex, causing a disadvantage in assemblability.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a planetary gear apparatus for a power transmission apparatus including a transmission housing including a sun gear provided on an axis of a first shaft, first and second planet carriers rotatably supporting a plurality of pinion gears gear-engaged with the sun gear, and a ring gear gear-engaged with the plurality of pinion gears, where an internal circumference of the sun gear is spline-engaged with an external circumference of the first shaft, where first and second support shafts are fixed to first and second side surfaces of the ring gear, respectively, where the first support shaft is rotatably supported by a supporting frame fixed to the transmission housing, a first bearing interposed between the first support shaft and the supporting frame, where the second support shaft is rotatably supported by the transmission housing, a second bearing interposed between the second support shaft and the transmission housing, where the first planet carrier is rotatably supported by the first support shaft, a third bearing interposed between the first planet carrier and the first support shaft, and where the second planet carrier is fixedly connected to a connection end portion of a second shaft.

A first fastening hole may be formed on a circumference of the first support shaft. A second fastening hole may be formed on a circumference of the second support shaft. A through hole may be formed on a circumference of the ring gear. The first and second support shafts may be coupled to corresponding stepped surfaces formed on side surfaces of the ring gear. The first and second support shafts may be fastened to the ring gear by a fastening bolt through the first and second fastening holes and the through hole.

The fastening bolt may be screw-engaged with the first fastening hole of the first support shaft by being inserted into the through hole of the ring gear through the second fastening hole of the second support shaft.

The first support shaft may form a first inner-side supporting end portion protruding axially inward and a first outer-side supporting end portion protruding axially outward, for supporting corresponding bearings.

The third bearing may be provided between the first inner-side supporting end portion and an internal circumference of the first planet carrier, to rotatably support the first planet carrier The first bearing may be provided between the first outer-side supporting end portion and the supporting frame, to be rotatably supported by the supporting frame.

The second support shaft may form a second outer-side supporting end portion protruding axially outward, to support the second bearing.

The second bearing may be provided between the second outer-side supporting end portion and the transmission housing, to be rotatably supported by the transmission housing.

A fourth bearing may be provided between an internal circumference of the second support shaft and an external circumference of the second shaft, to be rotatably supported by the second shaft.

An external gear for outputting a torque may be integrally formed on an external circumference of the ring gear. Gear teeth of the ring gear R and gear teeth of the external gear EG may be formed in helical teeth having a same spiral direction thereof.

According to a planetary gear apparatus for a power transmission apparatus, the ring gear is rotatably supported, in the vicinity of the first shaft, by the supporting frame and the transmission housing interposing the first and second bearings through the first and second support shafts at both side surfaces. Therefore, radial direction sizes of the bearings for supporting the ring gear may be decreased, improving space efficiency.

Furthermore, the planet carriers may be stably supported by the third bearing provided between the first inner-side supporting end portion of the first support shaft and the internal circumference of the first planet carrier and the fourth bearing provided between the internal circumference of the second support shaft and the external circumference of the second shaft connected to the second planet carrier. Furthermore, the third and fourth bearings supporting the planet carriers are formed as ball bearings, improving rolling efficiency.

Furthermore, the planetary gear apparatus may become compact by being provided as a single assembly in which the sun gear, the pinion gears, the first and second planet carriers, and the ring gear assembled by the first and second support shafts provided at both sides of the ring gear, and thereby assemblability and installability may be improved.

Other effects which may be obtained or are predicted by an exemplary embodiment will be explicitly or implicitly described in a detailed description of the present disclosure. That is, various effects that are predicted according to an exemplary embodiment will be described in the following detailed description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

To clarify the present disclosure, parts that are not related to the description will be omitted, and the same elements or equivalents are referred to with the same reference numerals throughout the specification.

In the following description, dividing names of components into first, second, and the like is to divide the names because the names of the components are the same as each other, and an order thereof is not particularly limited.

Figure 3:
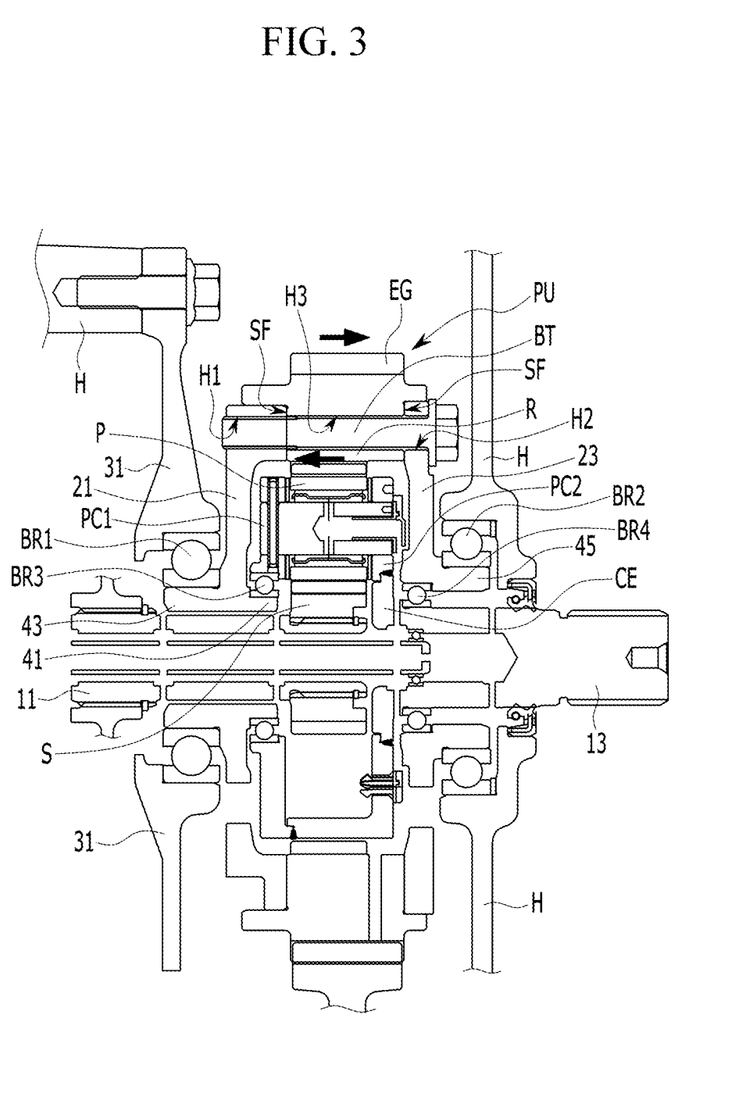
FIG. 3 illustrates a supporting structure of a planetary gear apparatus according to an exemplary embodiment of the present disclosure.
Figure 4:
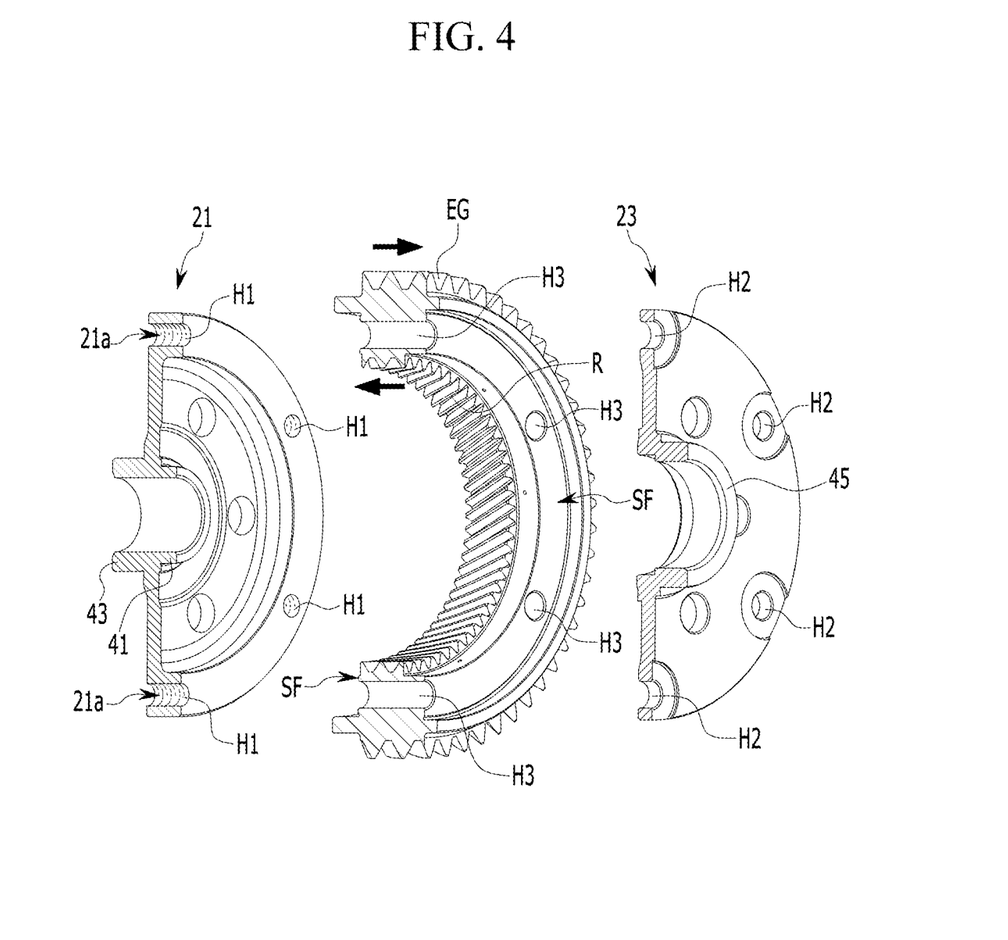
FIG. 4 is a cross-sectional exploded perspective view of a ring gear and first and second support shafts applied to a planetary gear apparatus according to an exemplary embodiment of the present disclosure.

FIG. 3 illustrates a supporting structure of a planetary gear apparatus according to an exemplary embodiment of the present disclosure. FIG. 4 is a cross-sectional exploded perspective view of a ring gear and first and second support shafts applied to a planetary gear apparatus according to an exemplary embodiment of the present disclosure.

First, a power transmission apparatus applied by a planetary gear apparatus PU according to an exemplary embodiment of the present disclosure may be applied to a hybrid electric vehicle (HEV), an electric vehicle (EV), a fuel cell electric vehicle (FCEV), and the like.

Referring to FIG. 3, within a transmission housing H of a power transmission apparatus, the planetary gear apparatus PU according to an exemplary embodiment of the present disclosure includes a sun gear S provided on an axis of a first shaft 11, first and second planet carriers PC1 and PC2 rotatably supporting a plurality of pinion gears P externally gear-meshed with the sun gear S, and a ring gear R internally gear-meshed with the plurality of pinion gears P.

Here, internal circumference of the sun gear S is spline-engaged with an external circumference of the first shaft 11.

First and second support shafts 21 and 23 are fixedly formed to both side surfaces of the ring gear R. The first support shaft 21 is rotatably supported by a supporting frame 31 fixed to the transmission housing H, interposing a first bearing BR1. The second support shaft 23 is rotatably supported by the transmission housing H, interposing a second bearing BR2.

Furthermore, the first planet carrier PC1 is rotatably supported by the first support shaft 21, interposing a third bearing BR3. Furthermore, the second planet carrier PC2 is fixedly connected to a connection end CE of a second shaft 13.

Here, when the planetary gear apparatus PU according to an exemplary embodiment of the present disclosure is applied to the power transmission apparatus of FIG. 1, the first shaft 11 corresponds to a first motor shaft MS1 in the power transmission apparatus of FIG. 1, and the second shaft 13 corresponds to an engine output shaft EOS in the power transmission apparatus of FIG. 1.

FIG. 4 is a cross-sectional exploded perspective view of the ring gear R and the first and second support shafts 21 and 23 applied to a planetary gear apparatus according to an exemplary embodiment of the present disclosure.

Referring to FIG. 4, a plurality of first fastening holes H1 are formed on a circumference of the first support shaft 21, a plurality of second fastening holes H2 are formed on a circumference of the second support shaft 23, and a plurality of through holes H3 are formed on a circumference of the ring gear R.

A stepped surface SF is formed on each side surfaces of the ring gear R, and the first and second support shafts 21 and 23 are coupled to corresponding stepped surfaces SF of the ring gear R.

The first and second support shafts 21 and 23 are fastened to the ring gear R by a fastening bolt BT through the first and second fastening holes H1 and H2 and the through hole H3.

The fastening bolt BT may be screw-engaged with the first fastening hole H1 of the first support shaft 21 by being inserted into the through hole H3 of the ring gear R through the second fastening hole H2 of the second support shaft 23.

As shown, a thread 21a to be engaged with the fastening bolt BT is formed on an internal circumference of the first fastening hole H1 of the first support shaft 21.

Furthermore, the first support shaft 21 integrally forms a first inner-side supporting end portion 41 and a first outer-side supporting end portion 43, at a central internal circumference. The first inner-side supporting end portion 41 protrudes axially inward (i.e., toward the ring gear), to support a corresponding bearing. The first outer-side supporting end portion 43 protrudes axially outward (i.e., opposite to the first inner-side supporting end portion 41), to support a corresponding bearing.

The third bearing BR3 is provided between the first inner-side supporting end portion 41 and an internal circumference of the first planet carrier PC1, to rotatably support the first planet carrier PC1.

The first bearing BR1 is provided between the first outer-side supporting end portion 43 and the supporting frame 31, to be rotatably supported by the supporting frame 31.

Furthermore, the second support shaft 23 integrally forms a second outer-side supporting end portion 45, at a central internal circumference. The second outer-side supporting end portion 45 protrudes axially outward, to support the second bearing BR2.

The second bearing BR2 is provided between the second outer-side supporting end portion 45 and the transmission housing H, to be rotatably supported by the transmission housing H.

Furthermore, a fourth bearing BR4 is provided between an internal circumference of the second support shaft 23 and an external circumference of the second shaft 13, to be rotatably supported by the second shaft 13.

Here, each of the first bearing BR1 provided between the first outer-side supporting end portion 43 and the supporting frame 31, the second bearing BR2 provided between the second outer-side supporting end portion 45 and the transmission housing H, the third bearing BR3 provided between the first inner-side supporting end portion 41 and the first planet carrier PC1, and the fourth bearing BR4 provided between the internal circumference of the second support shaft 23 and the external circumference of the second shaft 13 may be formed as a ball bearing.

Furthermore, in the planetary gear apparatus PU according to an exemplary embodiment of the present disclosure, an external gear EG for outputting a torque is integrally formed on an external circumference of the ring gear R. At the instant time, as shown in FIG. 4, gear teeth of the ring gear R formed as an internal gear and gear teeth of the external gear EG are formed in helical teeth and have a same spiral direction thereof. Therefore, axial directional load generated by the ring gear R and the external gear EG act in opposite directions (see arrows) and may be cancel out each other.

Here, when the planetary gear apparatus PU according to an exemplary embodiment of the present disclosure is applied to the power transmission apparatus of FIG. 1, the external gear EG may correspond to a drive gear DG externally gear-meshed with a driven gear PG on an output shaft OS.

According to a planetary gear apparatus for a power transmission apparatus PU, the ring gear R is rotatably supported, in the vicinity of the first shaft 11, by the supporting frame 31 and the transmission housing H interposing the first and second bearings BR1 and BR2 through the first and second support shafts 21 and 23 at both side surfaces. Therefore, radial direction sizes of the bearings for supporting the ring gear R may be decreased, improving space efficiency.

Furthermore, the planet carriers PC1 and PC2 may be stably supported by the third bearing BR3 provided between the first inner-side supporting end portion 41 of the first support shaft 21 and the internal circumference of the first planet carrier PC1 and the fourth bearing BR4 provided between the internal circumference of the second support shaft 23 and the external circumference of the second shaft 13 connected to the second planet carrier PC2.

The third and fourth bearings BR3 and BR4 supporting the planet carriers PC1 and PC2 are formed as ball bearings, improving rolling efficiency.

Furthermore, the planetary gear apparatus PU may become compact by being provided as a single assembly in which the sun gear S, the pinion gears P, the first and second planet carriers PC1 and PC2, and the ring gear R assembled by the first and second support shafts 21 and 23 provided at both sides of the ring gear R, and thereby assemblability and installability may be improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A planetary gear apparatus for a power transmission apparatus including a transmission housing, the planetary gear apparatus comprising:
   a sun gear provided on an axis of a first shaft;
   first and second planet carriers rotatably supporting a plurality of pinion gears gear-engaged with the sun gear; and
   a ring gear gear-engaged with the plurality of pinion gears,
   wherein an internal circumference of the sun gear is spline-engaged with an external circumference of the first shaft,
   wherein first and second support shafts are fixed to first and second side surfaces of the ring gear, respectively,
   wherein the first support shaft is rotatably supported by a supporting frame fixed to the transmission housing, a first bearing interposed between the first support shaft and the supporting frame,
   wherein the second support shaft is rotatably supported by the transmission housing, a second bearing interposed between the second support shaft and the transmission housing,
   wherein the first planet carrier is rotatably supported by the first support shaft, a third bearing interposed between the first planet carrier and the first support shaft, and
   wherein the second planet carrier is fixedly connected to a connection end portion of a second shaft.

2. The planetary gear apparatus of claim 1,
   wherein a first fastening hole is formed on a circumference of the first support shaft,
   wherein a second fastening hole is formed on a circumference of the second support shaft,
   wherein a through hole is formed on a circumference of the ring gear,
   wherein the first and second support shafts are coupled to corresponding stepped surfaces formed on side surfaces of the ring gear, and
   wherein the first and second support shafts are fastened to the ring gear by a fastening bolt through the first and second fastening holes and the through hole.

3. The planetary gear apparatus of claim 2, wherein the fastening bolt is screw-engaged with the first fastening hole of the first support shaft by being inserted into the through hole of the ring gear through the second fastening hole of the second support shaft.

4. The planetary gear apparatus of claim 2, wherein the first support shaft includes a first inner-side supporting end portion protruding axially inward and a first outer-side supporting end portion protruding axially outward, for supporting corresponding bearings.

5. The planetary gear apparatus of claim 4,
   wherein the corresponding bearings include the third bearing, and
   wherein the third bearing is provided between the first inner-side supporting end portion and an internal circumference of the first planet carrier, to rotatably support the first planet carrier.

6. The planetary gear apparatus of claim 4,
   wherein the corresponding bearings include the first bearing, and
   wherein the first bearing is provided between the first outer-side supporting end portion and the supporting frame, to be rotatably supported by the supporting frame.

7. The planetary gear apparatus of claim 2, wherein the second support shaft includes a second outer-side supporting end portion protruding axially outward, to support the second bearing.

8. The planetary gear apparatus of claim 7, wherein the second bearing is provided between the second outer-side supporting end portion and the transmission housing, to be rotatably supported by the transmission housing.

9. The planetary gear apparatus of claim 7, wherein a fourth bearing is provided between an internal circumference of the second support shaft and an external circumference of the second shaft, to be rotatably supported by the second shaft.

10. The planetary gear apparatus of claim 1,
- wherein an external gear for outputting a torque is integrally formed on an external circumference of the ring gear, and
- wherein gear teeth of the ring gear and gear teeth of the external gear are formed in helical teeth having a same spiral direction.

\* \* \* \* \*